United States Patent
Tong et al.

(10) Patent No.: US 11,722,589 B2
(45) Date of Patent: Aug. 8, 2023

(54) RAPID LEDGER CONSENSUS SYSTEM AND METHOD FOR DISTRIBUTED WIRELESS NETWORKS

(71) Applicants: Wen Tong, Ottawa (CA); Sheng Sun, Ottawa (CA)

(72) Inventors: Wen Tong, Ottawa (CA); Sheng Sun, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 544 days.

(21) Appl. No.: 16/843,612

(22) Filed: Apr. 8, 2020

(65) Prior Publication Data
US 2021/0319010 A1 Oct. 14, 2021

(51) Int. Cl.
| | |
|---|---|
| G06F 16/23 | (2019.01) |
| H04W 4/40 | (2018.01) |
| H04L 29/08 | (2006.01) |
| G06F 16/27 | (2019.01) |
| G06F 16/901 | (2019.01) |
| H04L 69/325 | (2022.01) |
| H04L 67/104 | (2022.01) |

(52) U.S. Cl.
CPC ........ *H04L 69/325* (2013.01); *G06F 16/2365* (2019.01); *H04L 67/104* (2013.01); *H04W 4/40* (2018.02)

(58) Field of Classification Search
CPC . H04L 69/325; H04L 67/104; G06F 16/2365; H04W 4/40; H04W 12/06
See application file for complete search history.

(56) References Cited

U.S. PATENT DOCUMENTS

| | | | |
|---|---|---|---|
| 8,442,424 B2* | 5/2013 | Socolof | H04N 7/155 |
| | | | 455/2.01 |
| 9,117,220 B2* | 8/2015 | Whalin | G06Q 30/0252 |
| 9,646,029 B1 | 5/2017 | Baird | |

(Continued)

FOREIGN PATENT DOCUMENTS

| | | |
|---|---|---|
| CN | 108964926 A | 12/2018 |
| CN | 109923536 A | 6/2019 |
| WO | 2018217804 A1 | 11/2018 |

OTHER PUBLICATIONS

The Swirlds Hashgraph Consensus Algorithm: Fair, Fast, Byzantine Fault Tolerance, Leemon Baird May 31, 2016.

(Continued)

*Primary Examiner* — Abdullahi E Salad (57) ABSTRACT

A computing device functions as a member of a distributed database system implemented using a wireless network. A member version of a chain graph is stored at the computing device. The chain graph includes events created by the computing device and events received through the wireless network from other computing devices that are members of the distributed database system. The computing device determines if it is a member of a voting committee that comprises only a subset of the computing devices that are members of the distributed database system. When the computing device is a member of a voting committee, it participates in a distributed consensus algorithm with other members of the voting committee using the wireless network to define an order of the events in the chain graph and stores that order as a new event in the member version of the chain graph.

12 Claims, 7 Drawing Sheets

(56) References Cited

U.S. PATENT DOCUMENTS

| | | | |
|---|---|---|---|
| 11,127,099 B2* | 9/2021 | Eidelman | G06F 16/3331 |
| 2003/0055719 A1* | 3/2003 | Faigle | H04N 21/4753 |
| | | | 348/E7.071 |
| 2005/0263594 A1* | 12/2005 | Onischu | G06Q 30/08 |
| | | | 235/386 |
| 2008/0184061 A1* | 7/2008 | Tripathi | G06F 11/1482 |
| | | | 714/4.1 |
| 2009/0251277 A1* | 10/2009 | O'Hara | G06Q 30/02 |
| | | | 340/5.1 |
| 2009/0265640 A1* | 10/2009 | Abernethy | G06Q 30/02 |
| | | | 715/751 |
| 2014/0074987 A1* | 3/2014 | Martz | G06F 21/6272 |
| | | | 709/219 |
| 2018/0007178 A1* | 1/2018 | Subhraveti | G06F 9/541 |
| 2018/0173747 A1* | 6/2018 | Baird, III | G06F 16/27 |
| 2019/0182313 A1* | 6/2019 | Yoo | H04L 67/10 |
| 2020/0026699 A1* | 1/2020 | Zhang | H04L 9/0643 |
| 2020/0059369 A1* | 2/2020 | Li | H04L 9/3247 |
| 2020/0162264 A1* | 5/2020 | Zamani | H04L 9/3247 |

OTHER PUBLICATIONS

Gossip-Based Broadcast, Joao Leitao, et al. 2010.
An RFID distance bounding protocol, Hancke, G.P., Kuhn, Securecomm 2005.
Hashgraph Consensus: Detailed Examples, Leemon Baird Dec. 11, 2016.

* cited by examiner

RAPID LEDGER CONSENSUS SYSTEM AND METHOD FOR DISTRIBUTED WIRELESS NETWORKS

TECHNICAL FIELD

The present disclosure relates to systems and methods for a distributed database in a vehicle-to-everything (V2X) network.

BACKGROUND

Vehicle-to-everything (V2X) communication enables a vehicle to communicate with surrounding entities such as, among other things, other vehicles, cell towers, access points, roadway infrastructure elements, smart grid elements, and pedestrians. V2X communication may, for example, include device-to-device communication such as vehicle-to-vehicle (V2V), vehicle-to-infrastructure (V2I), vehicle-to-grid (V2G), and vehicle-to-pedestrian (V2P), as well as device-to-network (V2N) communication such as cellular network based C-V2X communication, and wireless local area network (WLAN) based communication. Different protocols have been, or are being, developed to support V2X communication, including, for example the WLAN based IEEE 802.11p protocol released in 2012, the V2X protocol defined as Long-Term Evolution (LTE) V2X in the 3rd Generation Partnership Project (3GPP) releases 14 and 15, and the V2X protocols being developed under release 15.

The information provided and received by entities within a V2X network may, in some applications, impact the actions of traffic control systems and individual vehicle control systems, and may also be relied on by entities such as insurance companies and governments. Given the potential safety, financial, legal and regulatory impact of information exchanged within a V2X network, preserving the integrity of the information is of great importance. In this regard, V2X communication may incorporate traditional data integrity safeguards for a central database managed by a trusted central system or authority.

However, in some cases, a vehicle may be off-line or have limited access relative to a trusted central authority. Such a situation may, for example, occur if the vehicle is not within range of a cellular network, if the cellular network is denying access to the vehicle due to network capacity issues or other reasons, if a communication breakdown occurs between the cellular network and the central authority, or if the central authority has experienced a temporary failure or is currently unavailable for other reasons.

Accordingly, there is a need for a method and system that enables a distributed database for entities such as vehicles that does not rely on access to a trusted centralized authority. A known example of a distributed database system that does not rely on a central trusted authority is the peer-to-peer block chain data structure used for cryptocurrencies such as Bitcoin. Such systems are however inefficient by design and can be limited to a small number of transactions per second.

Accordingly, there is a need for a method and system that enables a distributed database for entities such as vehicles that is efficient.

SUMMARY

According to a first example aspect of the disclosure is a method performed at a computing device that is a member of a distributed database system implemented using a wireless network. The method includes storing a member version of a chain graph at the computing device. The chain graph includes events created by the computing device and events received through the wireless network from other computing devices that are members of the distributed database system. The method includes determining if the computing device is a member of a voting committee that comprises only a subset of the computing devices that are members of the distributed database system. When the computing device is a member of a voting committee, participating in a distributed consensus algorithm with other members of the voting committee using the wireless network to define an order of the events in the chain graph and storing that order as a new event in the member version of the chain graph.

In some example embodiments, membership of the voting committee varies during a time period that the computing device is a member of the distributed database system and determining if the computing device is a member of the voting committee is performed multiple times during the time period.

In some example embodiments the method includes exchanging events with other computing devices using a wireless network wherein the computing device randomly sends events that it has created to, and receives events from, the other computing devices according to a gossip protocol. In some example embodiments, the distributed consensus algorithm comprises a Byzantine agreement protocol.

In some example embodiments, determining if the computing device is a member of the voting committee comprises determining if a member ID associated with the computing device matches a predetermined criteria and if so, then determining that the computing device is a member of the voting committee. In some examples, determining if the member ID associated with the computing device matches the predetermined criteria comprises determining if a bit sequence within the member ID matches a predetermined bit sequence. In some examples, the member ID is updated at fixed time intervals by cyclically shifting bits of the member ID.

In further examples of the first example aspect, determining if the computing device is a member of the voting committee includes determining if the computing device has received a voting committee token from a computing device that is an existing member of the voting committee. In some examples, the method includes appointing a replacement computing device from among the other computing devices to replace the computing device as member of the voting committee. In some examples, appointing the replacement computing device includes: randomly selecting one of the other computing devices that is a member of the distributed database system as the replacement computing device; sending the voting committee token to the replacement computing device; receiving an acknowledgement from the replacement computing device; and upon authenticating the acknowledgement, notifying any of the other computing devices that are members of the voting committee of the appointment of the replacement computing device as a member of the voting committee.

According to a second example aspect a computing device configured to function as a member of a distributed database system implemented using a wireless network is disclosed. The computing device can be configured to perform the methods of the first example aspect. In some examples, the computing device includes a processor system, a wireless transceiver connected to the processor system for exchanging signals with other computing devices using wireless network and non-transitory memory connected to processor system. The non-transitory memory stores instructions that configure the processor system to: store a member version of a chain graph at the computing device, the chain graph including events created by the computing device and events received through the wireless network from other computing devices that are members of the distributed database system; determine if the computing device is a member of a voting committee that comprises only a subset of the computing devices that are members of the distributed database system; and when the computing device is a member of a voting committee, participate in a distributed consensus algorithm with other members of the voting committee using the wireless network to define an order of the events in the chain graph and storing that order as a new event in the member version of the chain graph.

In at least some examples, the method of the first example aspect and computing device of the second aspect enable a V2X distributed database system that can reach consensus within a practical time duration.

DESCRIPTION OF EXAMPLE EMBODIMENTS

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. Among other things, the methods and systems described in the present disclosure may be implemented in non-autonomous, semi-autonomous and autonomous vehicles.

Example embodiments relate to the use of cascade messaging techniques for implementing a V2X distributed database. Among other things, a distributed database may in some applications enhance one or more of the following data communication related functions: authentication; auditability; protection against forgery; and integrity assurance. In some applications, a distributed database may contribute to one or more of lowering the cost of V2X infrastructure, reducing overhead required to provide redundancy, facilitating parallel processing, and providing off-line database support.

Figure 1:
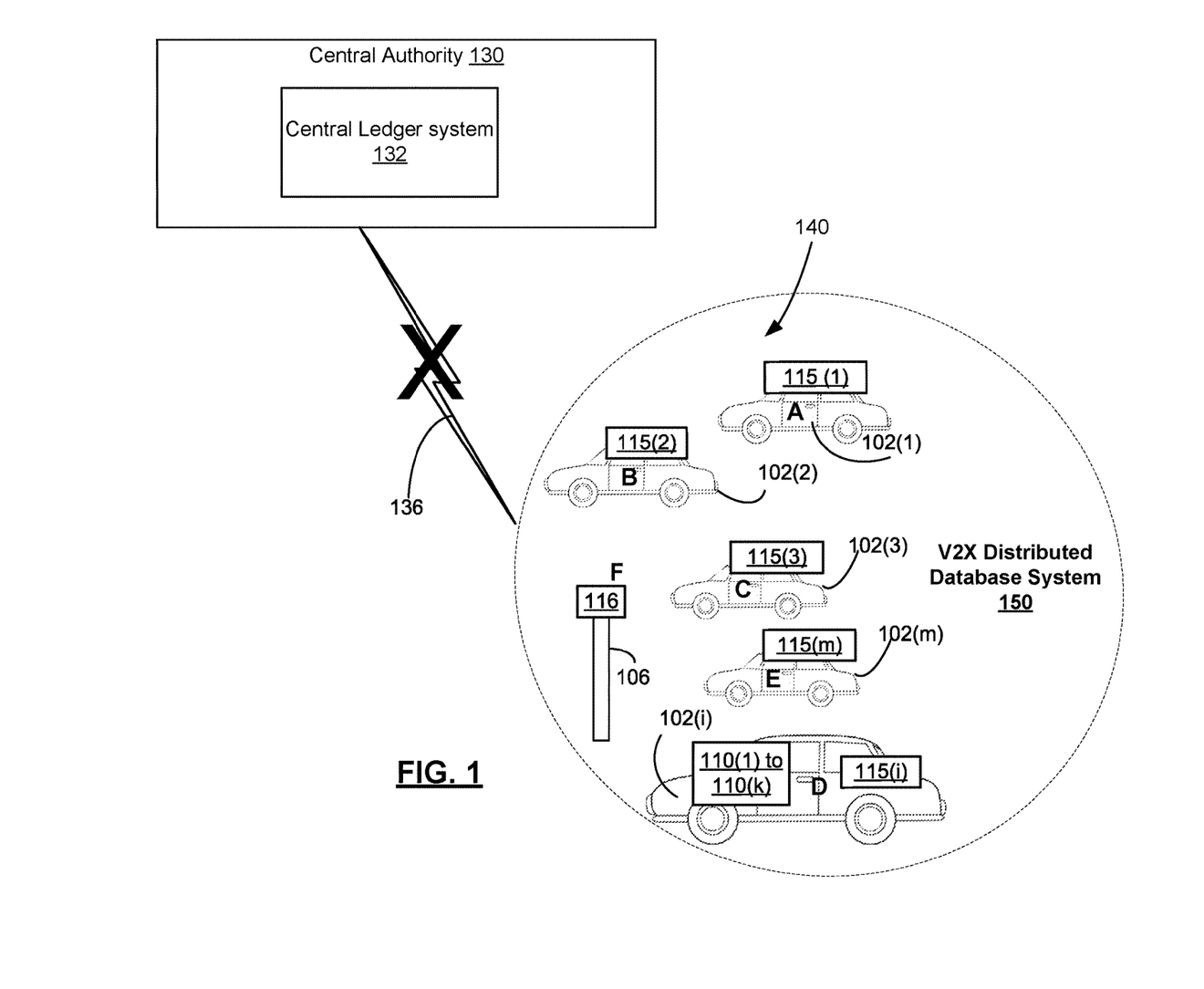
FIG. 1 is a schematic diagram of a V2X distributed database system according to example embodiments of the present disclosure.

FIG. 1 is a schematic diagram illustrating an environment in which distributed V2X distributed database may be implemented. FIG. 1 illustrates a plurality of entities, including a plurality of vehicles 102(1) to 102(m) (collectively referenced as vehicles 102, with individual vehicles generically referred to as vehicle 102(i)), and infrastructure elements 106 (e.g., a stationary pole-mounted traffic camera, a traffic light, a programmable traffic sign, among other things). Each of the vehicles 102(1) to 102(m) includes an on-board processor-enabled computing device 115(1) to 115(m) respectively (collectively referenced as computing devices 115, with individual computing devices generically referred to as computing device 115(i)) that is enabled for wireless communication. Similarly, at least some infrastructure elements 106 may include an on-board processor-enabled computing device 116 enabled for wireless communication. In example embodiments, the computing devices 115 of vehicles 102 and computing devices 116 of infrastructure elements 106 are each configured to communicate with a remote central authority 130 through a wireless wide area network (WAN) 136 (e.g., a cellular network). By way of example, computing devices 115 and 116 may be configured to use one or more cellular vehicle-to-network (C-V2N) protocols to enable communications over WAN 136. Additionally, the computing devices 115 and 116 are also enabled to communicate peer-to-peer with each other using wireless local area networks. In this regard, computing devices 115 and 116 may be configured to use one or more vehicle-to-everything (V2X) protocols to enable a peer-to-peer sidelink (SL) V2X communication network 140. For example communication network 140 may be a New Radio SL compliant network. Accordingly, in example embodiments, peer-to-peer SL V2X communication network 140 provides a medium or connection that enables computing devices 115(1) to 115(m) and computing device 116 to exchange wireless signals with one or more of each other.

In example embodiments, in addition to processor enabled computing device 115(i), as part of or in addition to computing device 115(i), an example vehicle 102(i) also includes a plurality of additional on-board processor enabled electronic devices 110(1) to 110(k). Among other things, electronic devices 110(1) to 110(k) may include data capture devices or units that can sense, collect and process information about the environment of the vehicle 102(i). By way of example, on-board electronic devices 110(1) to 110(k) associated with vehicle 102(i) may include one or more devices that sense and process information about the physical environment surrounding the vehicle such as light detection and ranging (LIDAR) units, radio detecting and ranging (RADAR), and/or video camera units. Electronic devices 110(1) to 110(k) may also include devices that collect and process information about the physical operating environment of subject vehicle 102(i) such as inertial measurement units (IMUs), speedometer units, and other vehicle physical operating environment measurement units. By way of example, information about the physical operating environment of subject vehicle 102(i) generated by electronic devices 110(1) to 110(k) may include, among other things, parameters that are indicative of one or more of: vehicle speed; engine RPM; angular acceleration; linear acceleration; throttle position; steering angle; brake position; vehicle pose; engine temperature; vehicle interior and exterior noise levels; number of vehicle occupants; and driver attentiveness. The Electronic devices 110(1) to 110(k) may also include devices that collect and process information about the geographic location of vehicle 102($i$) such as a global positioning satellite unit. Computing devices 116 of infrastructure elements 106 may also include or be connected to additional processor enabled electronic devices that sense and collect information about the physical environment surrounding the infrastructure elements.

In example embodiments, when computing devices 115, 116 are online with respect to WAN 136, they can communicate through WAN 136 with one or more centralized remote systems, including a central authority 130. In example embodiments, central authority 130 includes one or more computer systems, such as servers, that are configured to implement a trusted central ledger system 132. When computing devices 115, 116 are online they can each communicate with the central ledger system 132 through WAN 136 to enable data authentication, tracking and auditing functions.

However, when one or more computing devices 115, 116 are offline with respect to central authority 130 (for example when one or more vehicles 102 are in a region that is not serviced by WAN 136, or a computing device 115, 116 is otherwise denied access to WAN 136 or to central authority 130), the computing device 115 or 116 cannot communicate through WAN 136 with the central ledger system 132 of central authority 130. This situation can be problematic in the event that the functionality of trusted central ledger system 132 is required when a computing device 115 or 116 is offline. For example, in the case where a vehicle 102($i$) is involved in an accident while its respective computing device 115($i$) is offline, an insurance provider may want to be able to confirm the timing and authenticity of records generated by one or more of the electric devices 110(1) to 110($k$) about the surrounding physical environment of the vehicle or the physical operating environment of the vehicle 102($i$) at the time of the accident.

Accordingly, in example embodiments, the computing devices 115(1) to 115($m$) of vehicles 102 and are each respectively configured to function as respective nodes or members that collectively implement a V2X distributed database system 150. In at least some examples, the computing device 116 of infrastructure element 106 (labelled as representative member F in the Figures) also acts as a member within V2X distributed database system 150. In example embodiments, the exchange of data between distributed database members implemented by computing devices 115, 116 is performed using peer-to-peer SL V2X communication network 140.

Figure 2:
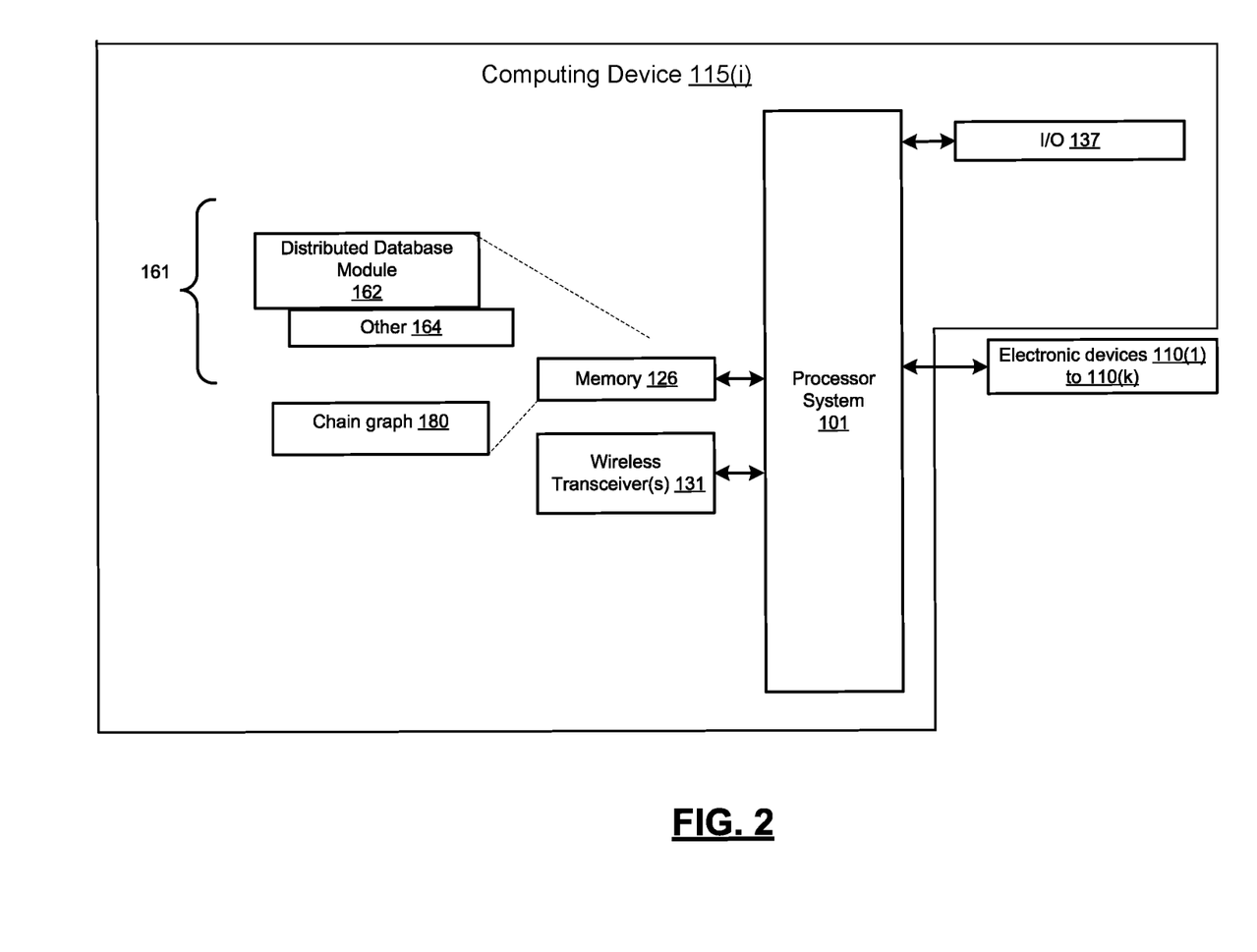
FIG. 2 is a block diagram of a computing device that may be used to implement node members in the distributed database system of FIG. 1, according to example embodiments.

FIG. 2 is a block diagram that illustrates an example of computing device 115($i$) that may be used to implement a vehicle-based distributed database module of V2X distributed database system 150. As noted above, computing device 115($i$) may be connected to, or include, a plurality of on-board electronic devices 110(1) to 110($k$) that can include devices or units that can sense, collect and process information about the surrounding physical environment and physical operating environment of a vehicle 102($i$). In some examples, computing device 115($i$) may be connected to vehicle systems such as a drive control system and an electromechanical system.

The computing device 115($i$) includes a processor system 101 that is coupled to a plurality of components via a communication bus which provides a communication path between the components and the processor system 101. The processor system 101 is coupled to memory 126 that may include Random Access Memory (RAM), Read Only Memory (ROM), and persistent (non-volatile) memory such as flash erasable programmable read only memory (EPROM) (flash memory). The computing device 115($i$) includes one or more wireless transceivers 131 that enable the computing device 115($i$) to exchange data with WAN 136 and peer-to-peer SL V2X communication network 140. Computing device 115 may also include a satellite receiver for receiving satellite signals from a positioning satellite network. The computing device 115($i$) may also include one or more I/O interfaces 137 such as a touchscreen and audio input/output interfaces. The processor system 101 may include one or more processing units, including, for example, one or more central processing units (CPUs), one or more graphical processing units (GPUs), and other processing units.

The memory 126 of the computing device 115($i$) has stored thereon sets of software instructions executable by the processor system 101 that configure the computing device 115($i$) to implement a number of modules 161. The modules 161 include, among other things, a distributed database module 162 that configures the computing device 115($i$) to function as a member in the V2X distributed database system 150 as will be described in greater detail below. Modules 161 may also include other modules 164, which may include, for example, a communication module, mapping module, navigation module, autonomous and assisted driving modules, climate control module, media player module, telephone module and messaging module The memory 126 also stores a variety of data for supporting modules 161, including data that represents a chain graph 180.

In example embodiments, computing devices 116 of infrastructure elements 106 may be implemented using an arrangement of electronic components similar to that of computing device 115($i$).

In example embodiments, each distributed database module 162 functions as a member in V2X distributed database system 150. In this regard, in FIG. 1 and throughout the remaining Figures the letters A through E are used to label respective members implemented at vehicles 102(1) to 102($m$) and letter F to label a member implemented at infrastructure elements 106.

In example embodiments, members A to F are configured to manipulate data, including storing, modifying, and/or deleting data. In some embodiments, members A to F may implement a relational database, object database, post-relational database, and/or any other suitable type of database. For example, the members A to E can store data related to vehicle physical operating environment and surrounding physical environment. In general, the data can include any set of values for a parameter, and a parameter can be any data object and/or database field capable of taking on different values.

In example embodiments, the member A to F implemented at a computing device 115($i$) or 116 can exchange events with the members A to F implemented by other computing devices 115($i$), 116, store events that the member receives, and calculate an ordering of events based on the partial order defined by the pattern of references between the events. In this regard, in example embodiments, sets of events and their interconnections can form a chain graph 180 (see FIG. 3, which illustrates members A to E). In example embodiments, at any given time each of the members A to F stores its own version of a chain graph 180 that represents that member's perception of the events and interconnections for all of the members A to F that make up the V2X distributed database system 150.

In this regard, a respective version of chain graph 180 is constructed at each member based on inter-member communications through V2X SL network 140. In example embodiments, the members are configured to collectively implement a gossip protocol to exchange chain graph information. As known in the art, a gossip protocol configures members to repeatedly communicate with each other at random to synchronize information stored at the respective members.

Figures 3, 4:
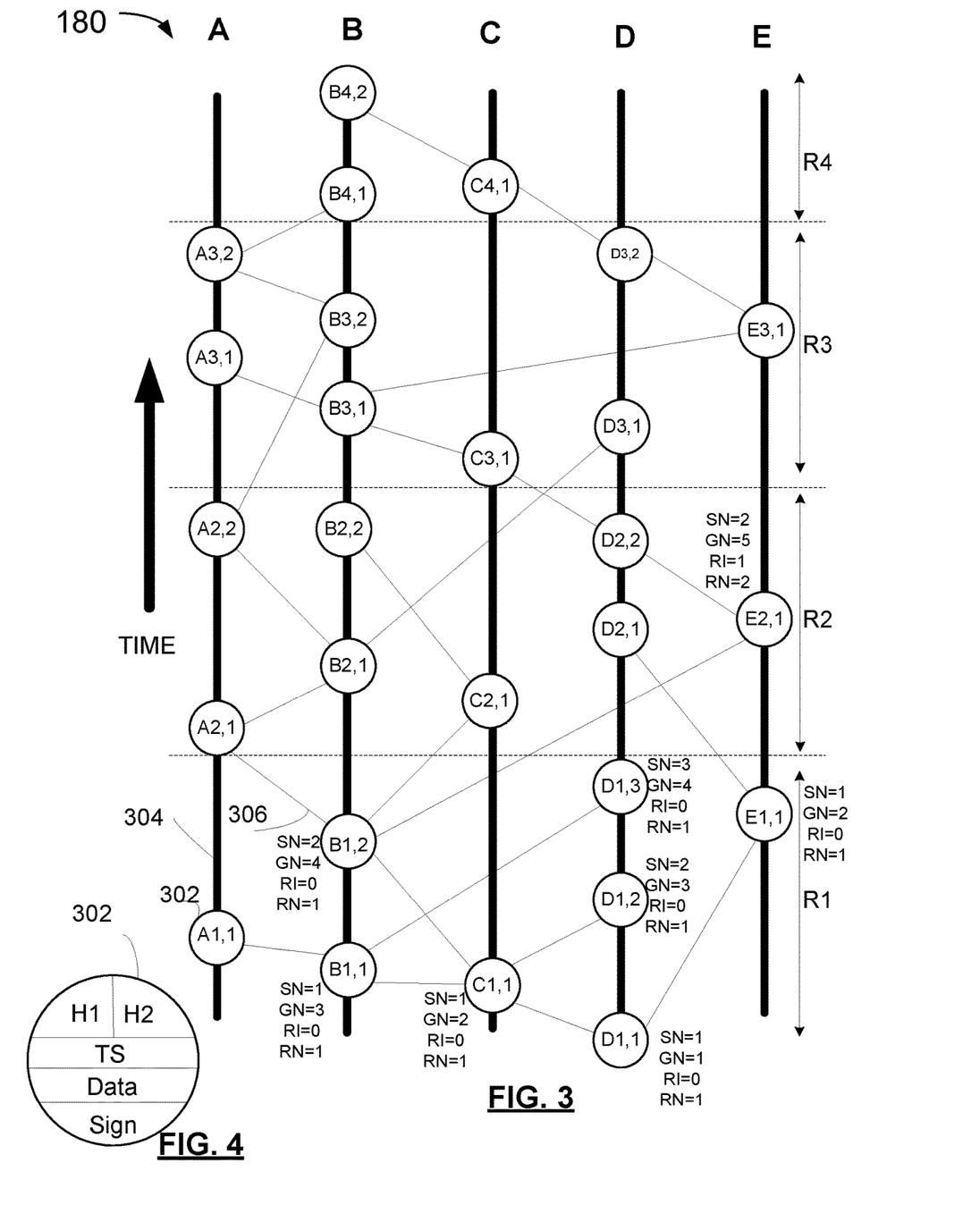
FIG. 3 is a representation of a chain graph according to example embodiments.
FIG. 4 shows an event in the chain graph of FIG. 3 according to example embodiments.

In this regard, FIG. 3 is a graphical representation of an example of a chain graph 180, which grows over time. Each member A to F stores its own version of chain graph 180. The chain graph 180 includes an event thread 304 for each member, and each event thread 304 includes a set of events 302 that occur at the member over a plurality of rounds (shown as R1 to R4 in FIG. 3). Events 302 on the event thread 304 of one member can be connected to one or more events 302 on the event threads 304 of one or more other members as indicated by inter-thread connections 306. For ease of illustration, only the event threads 304 of members A through E are shown in FIG. 3. Events are referred to generically herein by reference 302 and specifically by the notation shown in FIG. 3 (Xa,b) where X identifies the member that creates the event 302, "a" identifies a round that the event 302 is created in, and "b" identifies the order that the event 302 was created in during the round "a". By way of example, B1,2 refers to the second event created by member B during round 1.

Each event 302 is a record or data structure, an example of which is illustrated in FIG. 4. In example embodiments, each event 302 includes hashes (H1, H2) of two prior events, a time stamp (TS) timestamp (e.g., date and UTC time) asserting the creation time of the event by the member, a cascade message (Data), and a digital signature (Sign) applied to the event by the member. Among other things, the Data may include information that is generated by one or more of the electronic devices 110(1) to 110(k) of the vehicle 102 that implements the member. For example, Data can include environmental data about a vehicle's surrounding physical environment and the vehicle's physical operating environment.

In example embodiments, hashes (H1, H2) link each event 302 in a chain graph 180 to two earlier events. In some embodiments, the hashes H1, H2 are based on cryptographic hashes such that chain graph 180 is a hashgraph. In example embodiments, hash H1 is a self-parent event hash, meaning it is a hash of a prior event on the thread of the member that creates the hash, and hash H2 is an other-parent event hash, meaning it is a hash of a prior event on the thread of another member. For example, event D1,2 in FIG. 3 is a child of self-parent event D1,1 and other-parent event C1,1. Hash H1 for event D1,2 will be a hash of event D1,1 and hash H2 for event D1,2 will be a hash of event C1,1. Accordingly, in example embodiments, the chain graph 180 directly encodes a partial order, meaning that event X is known to come before event Y if Y contains a hash of X, or if Y contains a hash of an event that contains a hash of X. If, however, there is no path from X to Y or from Y to X, then the partial order does not define which event came first. Therefore, members may calculate a total order from the partial order. This can be done by any suitable deterministic function so that the members all calculate the same order. In some embodiments, members can recalculate this order after each sync, and eventually these orders can converge so that a consensus emerges. As will be explained in greater detail below, in example embodiments, only a subset of the members (e.g., members of a voting committee) are tasked with calculating a total order from the partial order, and then this total order is disseminated through the remaining members using gossip protocol.

In some instances, the first event 302 recorded by a member may include a hash for a single event defined by another distributed database module 162. In such instances, the member does not yet have a prior self-hash (e.g., a hash of an event previously defined by that member—see for example event E1,1 in FIG. 3). In some instances, the first event in a distributed database does not include a hash of any prior event (since there is no prior event for that distributed database-see for example event D1,1 in FIG. 3).

In example embodiments, the hash of an event (e.g. hash of event D1,1 that is used as hash H1 in event D1,2) can be a value returned from a hash function using a selection of predetermined bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash.

A distributed consensus algorithm can be used to determine the order of events 302 in a chain graph 180 and/or the order of data stored within the events 302. The order of events in turn can define a state of a database as a result of performing those events according to the order. The defined state of the database can be stored as a database state variable.

Although different consensus algorithms can be applied in various example embodiments, in one example embodiment the Swirlds hashgraph consensus algorithm is modified for use in V2X distributed database system 150. An example of the Swirlds hashgraph consensus algorithm is described in the reference: [1] "Leemon Baird. The Swirlds HashGraph Consensus Algorithm: Fair, Fast, Byzantine Fault Tolerance. *SWIRLDS TECH REPORT SWIRLDS-TR*-2016-01. May 31, 2016, Revision date: Mar. 18, 2018", the contents of which are incorporated herein by reference. The Swirlds hashgraph consensus algorithm is a leaderless system in which all members participate in voting. However, such a system can take a long time to converge and may be resource intensive and cumbersome for efficient, scalable use in the V2X environment.

Accordingly, in example embodiments, the consensus algorithm is modified so that voting is done by a subset, or committee, of the members rather than based on voting by all members. By way of example, given a hash graph with a full member set of members {A, B, C, D, E, F, G, H, I}, at intermittent intervals a voting committee will be elected by randomly choosing a subset of the full member set of members as a voting committee. For example, a new voting committee comprising member subset V={A, B, C, D, E} may be randomly selected as the voting committee VC for determining the order of events for a particular round (for example Round R3) R2. The random selection of a voting committee VC for each round may mitigate against fraud attacks while also providing a scalable solution that can be implemented in a dynamic V2X environment.

Non-Interactive Voting Committee Selection

Figure 5:
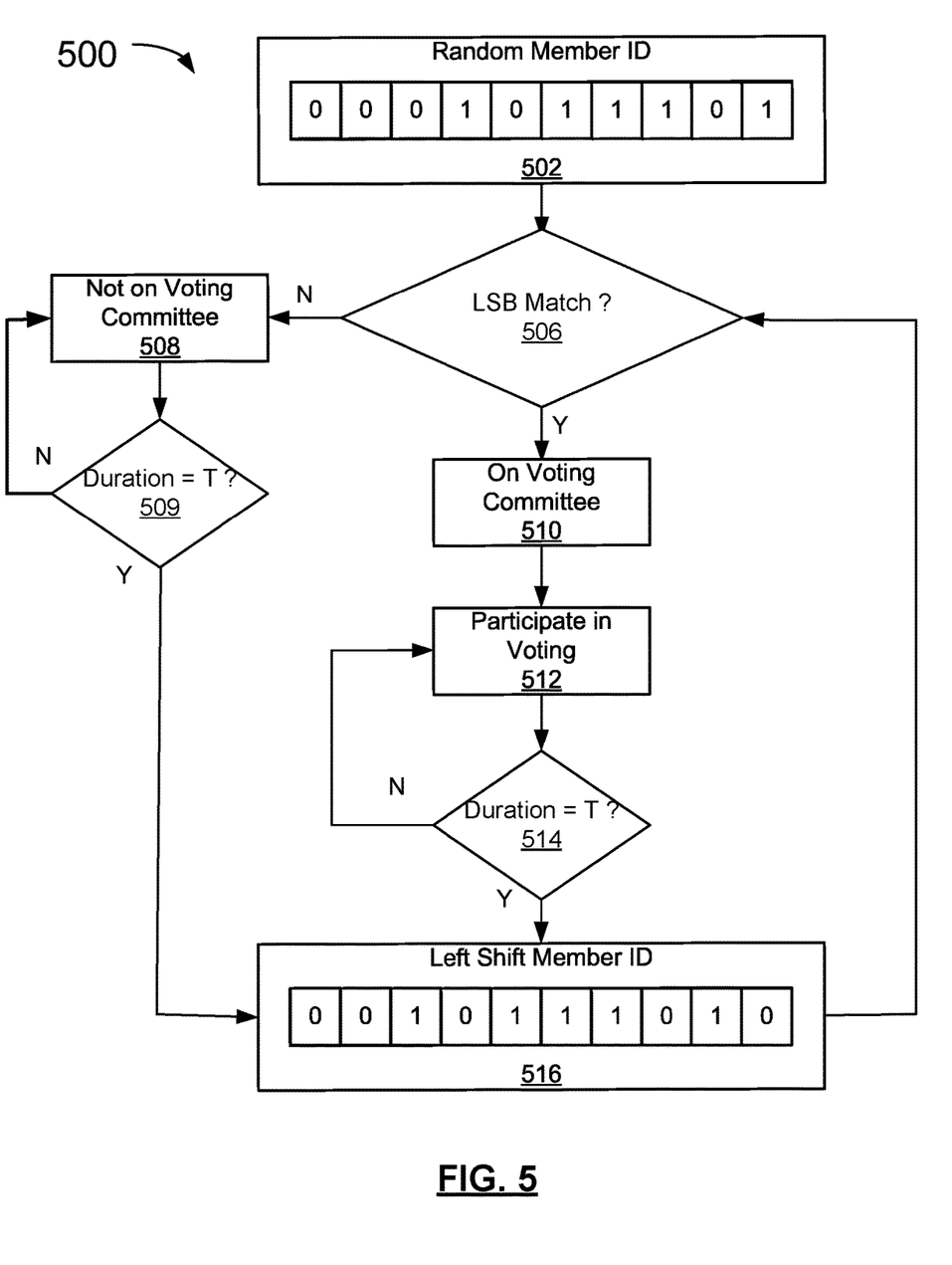
FIG. 5 is a flow diagram of one example of a randomized non-interactive selection procedure that may be used to select a voting committee.

In an example embodiment, committee members for the voting committee are selected at intermittent intervals using a non-interactive randomized selection procedure. In this regard, FIG. 5 illustrates one example of a randomized non-interactive selection procedure 500 that may be used to select a voting committee VC. The procedure 500 is executed independently at each member. When a member joins peer-to-peer SL V2X communication network 140 it becomes a part of an instance of a V2X distributed database system 150 for recording events 302 that occur while the member is part of peer-to-peer SL V2X communication network 140. Upon joining V2X distributed database system 150, each member undergoes an initialization procedure in which the member is randomly assigned a member ID (Block 502). In the illustrative example of FIG. 5, the random member ID is a 10 binary digit ID. In some examples, the random member ID could be assigned by existing members of the voting committee VC, and in some examples the random member ID may be self-assigned. In some examples, the random member ID may be based on a combination of committee assignment and self-assignment. In example embodiments, the random member ID may be assigned in a similar manner as temporary mobile subscriber identity (TMSI) numbers are generated in mobile networks. For example, a member may use its own permanent member ID to join the V2X distributed database system 150, and then be assigned the random member ID As will be described below, the random member ID is updated intermittently, for example at fixed time intervals T.

During operation of the V2X distributed database system 150, members are configured to self-evaluate if they are on the voting committee based on their currently assigned member ID. For example, the member's member ID can be compared to a predetermined criteria (Block 506) (e.g., do 4 least significant bits (LSBs) match a predetermined 4 bit value?). If the member's member ID matches the predetermined criteria, the member self-determines that it is part of the voting committee VC (Block 510), otherwise, the member self-determines that it is not part of the voting committee VC (Block 508). As indicated by block 512, during the time interval that a member is a member of the voting committee VC that member will participate in any consensus voting that occurs during that time interval. In some example embodiments, the member creates an event 302 to record that it has become member of the voting committee.

As noted above, the member ID is updated intermittently, for example at predefined time intervals T (blocks 509, 514). In the illustrated example, the update is performed by a cyclic left-shift of the member ID by 1 bit. The actions indicated in block 506 and onward are then performed in view of the updated member ID. In some example embodiments, the member creates an event 302 to record that it has stopped being a member of the voting committee.

Interactive Voting Committee Selection

In an alternative example embodiment, committee members for the voting committee are selected at intermittent intervals using an interactive randomized selection procedure during which the members interact through V2X SL network 140.

Figure 6:
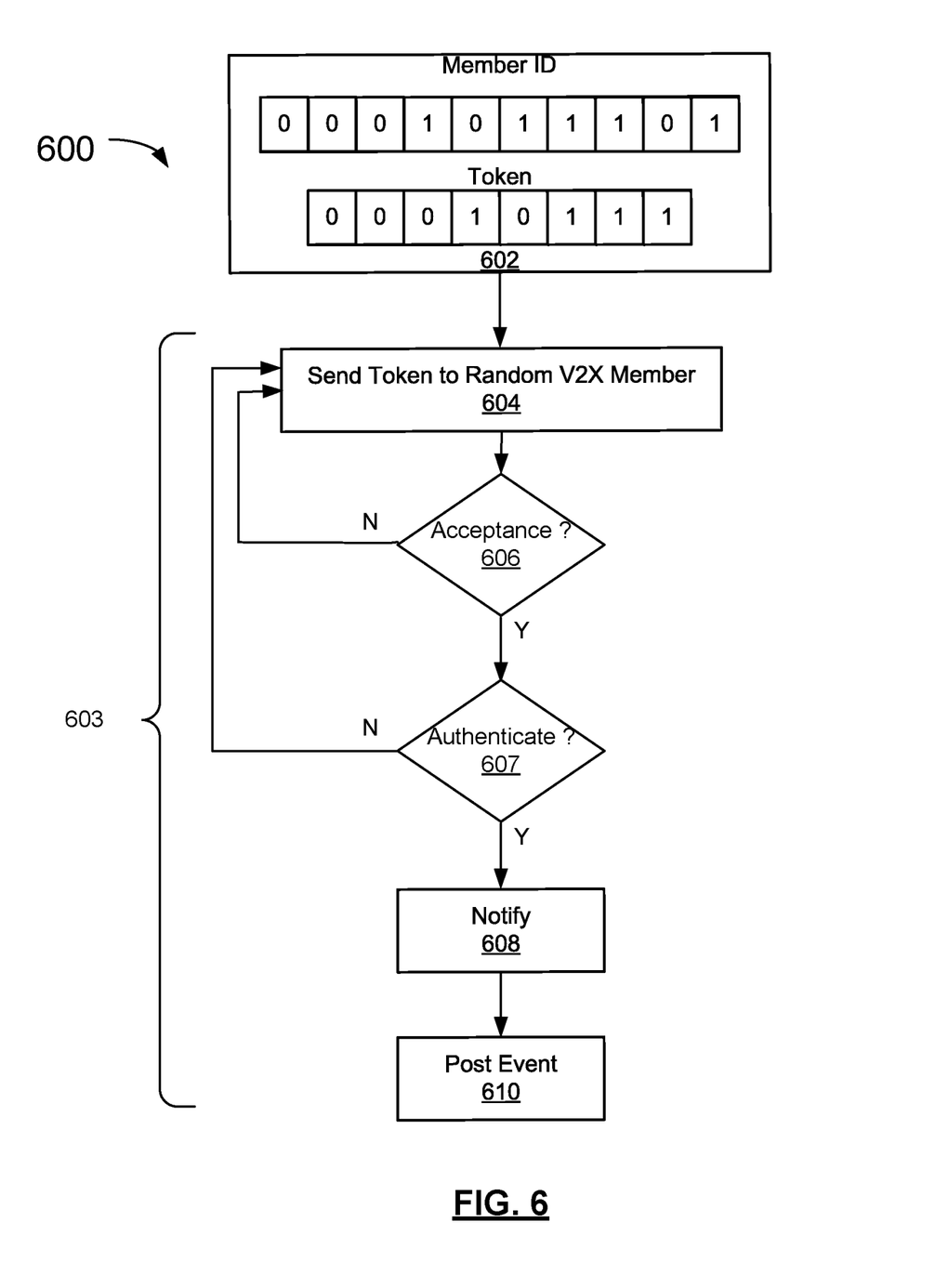
FIG. 6 is a flow diagram of an example of a randomized interactive selection procedure that may be used to select a voting committee.
Figure 7:
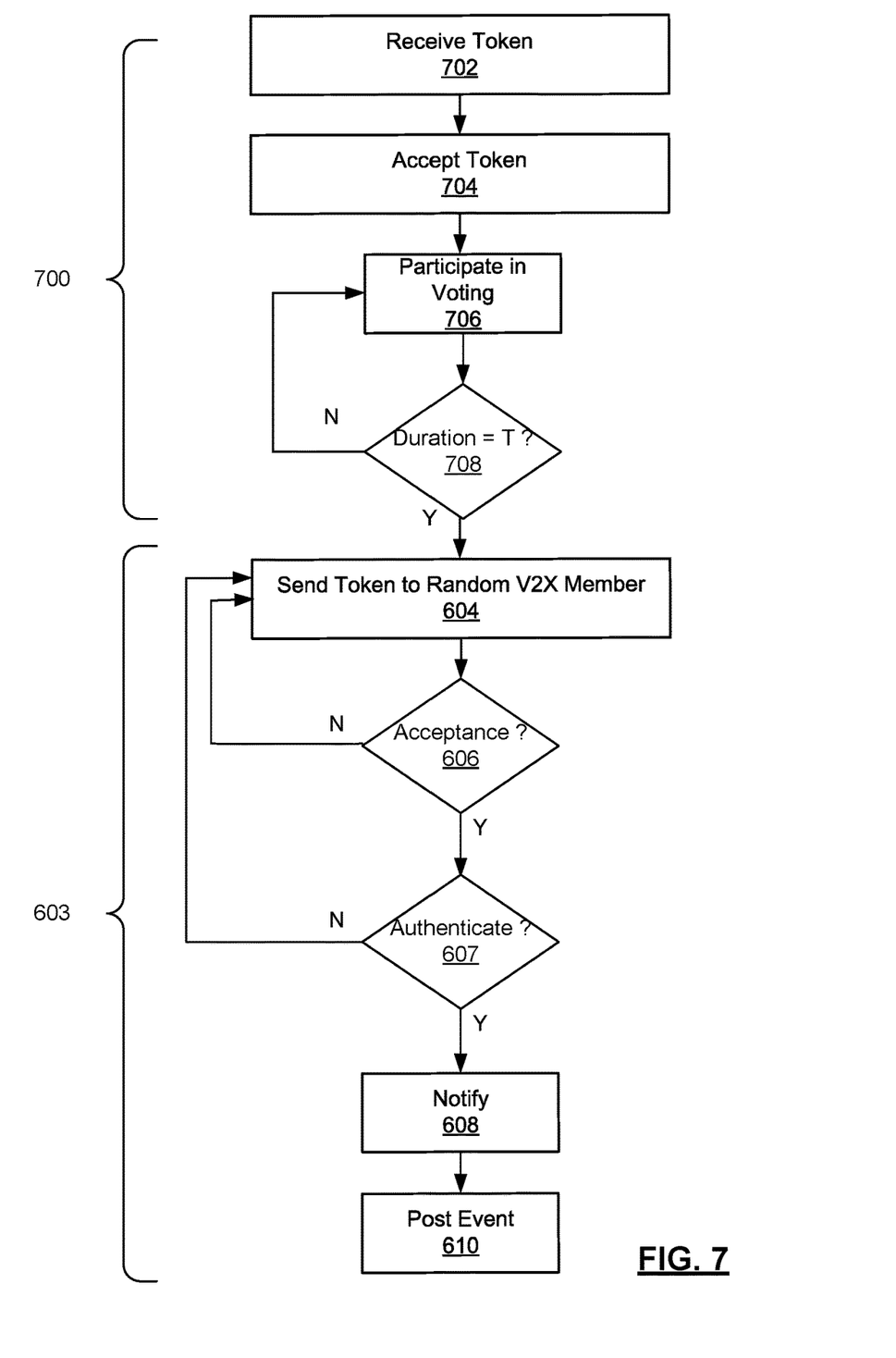
FIG. 7 is a further flow diagram of the randomized interactive selection procedure of FIG. 6.

In this regard, FIGS. 6 and 7 illustrate an example of a randomized interactive selection procedure that may be used to select a voting committee VC. FIG. 6 shows an initialization procedure 600 that occurs at a member when an instance of a V2X distributed database system 150 is initialized. The members are each assigned a respective member ID (Block 602). Additionally, a subset of the members are provided with voting committee tokens (for example an 8-bit string). For example, the first N nodes to become members may be initially assigned voting committee tokens In some examples, the members that are initially assigned voting committee tokens may function as an initial voting committee VC for a fixed predefined time interval T, after which each member appoints a peer member as its voting committee member replacement, as indicated by member appointment procedure 603. In some examples, the members that are initially assigned voting committee tokens may immediately appoint other members as voting committee member replacements, as indicated by member appointment procedure 603.

As illustrated, during member appointment procedure 603, a member that is currently part of the voting committee VC (e.g., member B in an illustrative example) randomly selects at least one of the other members (e.g., member E in the present example) that is part of V2X distributed database system 150 as a prospective appointee member. The current voting committee member (member B) transmits its member ID and voting committee token to the randomly chosen appointee member (member E) (block 604). The current voting committee member (member B) then receives an acknowledgement from the randomly chosen appointee member (member E) that indicates acceptance or non-acceptance (Block 606). If the acknowledgement indicates an acceptance, it will include the appointee's member ID (member E's assigned member ID). The current voting committee member (member B) then authenticates the appointee member (member E) (Block 607). In the illustrated example, authentication is based on a combination of the voting committee and appointee members' member IDs and the voting committee token. For example, current voting committee member (member B) may be configured to positively authenticate the appointee member (member E) if the following test equation is true:

$$\text{voting committee token} = (\text{current voting committee member ID}) \text{XOR} (\text{appointee member ID}) \text{XOR} (\text{voting committee token}).$$

In the event that the appointee member (member E) is authenticated, the current voting committee member (member B) notifies the other existing current voting committee members that it (member E) is being replaced on the voting committee VC by the appointee member (member E) (Block 608). In example embodiments, this notification may be performed by direct messages sent to each of the other voting committee members. Additionally, the outgoing voting committee member (member B) posts an event 302 on its thread 304 that specifies that the appointee member (member E) has become a part of the current voting committee VC. In some examples, posting the event 302 that specifies that the appointee member (member E) has become a part of the current voting committee VC may also function to notify the other voting committee members of the new appointee member (member E) as that event will propagate through the members through the gossip protocol. In such case, the 'notify' and 'post event' actions of blocks 608 and 610 can be combined.

As indicated in FIG. 6, in the event that the prospective appointee member (member E) does not accept appointment to the voting committee in Block 606 or is not authenticated by the current voting committee member (member B) in Block 607, the current voting committee member (member B) sends the voting committee token to a different random prospective appointee member among the members, repeating the process of blocks 604, 606 and 607 until an appointee member accepts and is authenticated.

FIG. 7 illustrates an acceptance procedure 700 and new voting committee member appointment procedure 603 from the perspective of the appointee member (member E in the present example). In particular, after receiving a voting committee token from current voting committee member (member B) (Block 702), the appointee member (member E) sends an acknowledgement back to the current voting committee member (member B) that includes the appointee member's member ID as part of an indication of acceptance of appointment to the voting committee VC (Block 704). The appointee member (member E) then becomes a current member of voting committee VC and participates in upcoming consensus votes (block 706). After participating as a current voting committee member for a predetermined time duration T (block 708), the current voting committee member (member E) then undertakes new voting committee member appointment procedure 603 in the same manner as described above to replace itself on the voting committee VC.

Consensus Voting

An example of committee based consensus voting process performed by members of a voting committee VC will now be described with reference to the example chain graph 180 of FIG. 3.

As shown in FIG. 3, each member (subset of members A, B, C, D and E are shown in FIG. 3) creates and/or defines events 302. In an example embodiment, a total order for the events 302 can be calculated by sorting the events 302 by their received round (also referred to herein as an order value), breaking ties by their received timestamp, and breaking those ties by their signatures, as described below.

The following paragraphs specify functions used to calculate and/or define an event's received round and received generation to determine an order for the events.

"Parent": an event X is a parent of event Y if Y contains a hash of X. For example, in FIG. 3, the parents of event D1,1 include event D1,1 and event C1,1.

"Ancestor": the ancestors of an event X are X, its parents, its parents' parents, and so on. For example, in FIG. 3, the ancestors of event E2,1 are events E1,1, D1,1, B1,2, and B1,1. Ancestors of an event can be said to be linked to that event and vice versa.

"Descendant": the descendants of an event X are X, its children, its children's children, and so on.

"N": the total number of members in the voting committee VC at the time of a vote.

"M": the least integer that is more than a certain percentage of N (e.g., more than ⅔ of N). For example, if N=5, and the percentage is defined to be ⅔, then M is equal to four.

"Self-parent": the self-parent of an event X is its parent event Y created and/or defined by the same member. For example, in FIG. 3, the self-parent of event D1,2 is D1,1.

"Self-ancestor": the self-ancestors of an event X are X, its self-parent, its self-parent's self-parent, and so on.

"Sequence Number" (or "SN"): an integer attribute of an event, defined as the Sequence Number of the event's self-parent, plus one. For example, in FIG. 3, the self-parent of event D1,2 is D1,1. Since the Sequence Number of event D1,1 is one, the Sequence Number of event D1,2 is two (i.e., one plus one).

"Generation Number" (or "GN"): an integer attribute of an event, defined as the maximum of the Generation Numbers of the event's parents, plus one. For example, event E2,1 has two parents, events E1,1 and B1,2, having Generation Numbers four and two, respectively. Thus, the Generation Number of event E2,1 is five (i.e., four plus one).

"Round Increment" (or "RI"): an attribute of an event that can be either zero or one.

"Round Number" (or "RN"): an integer attribute of an event. In some instances, Round Number can be defined as the maximum of the Round Numbers of the event's parents, plus the event's Round Increment. For example, in FIG. 3, event E2,1 has two parents, events B1,2 and E1,1, both having a Round Number of one. Event E2,1 also has a Round Increment of one. Thus, the Round Number of event E2,1 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 3, if M is defined to be the least integer greater than ½ times N, then M is three. Then event E2,1 strongly sees the M events D1,1; C1,1 and E1,1, each of which was defined by a different member and has a Round Number of 1. The event E2,1 cannot strongly see at least M events with Round Number of 2 that were defined by different members. Therefore, the Round Number for event E2,1 is 2. In some instances, the first event in the V2X distributed database system 150 includes a Round Number of 1. In other instances, the first event in the distributed database V2X distributed database system 150 can include a Round Number of 0 or any other suitable number.

"Forking": an event X is a fork with event Y if they are defined and/or created by the same member, and neither is a self-ancestor of the other.

"Identification" of forking: forking can be "identified" by a third event created and/or defined after the two events that are forks with each other, if those two events are both ancestors of the third event. In some instances, identification of forking can indicate that a particular member has cheated.

"Identification" of an event: an event X "identifies" or "sees" an ancestor event Y if X has no ancestor event Z that is a fork with Y. For example, in FIG. 3, event E2,1 identifies (also referred to as "sees") event B1,1 because event B1,1 is an ancestor of event E2,1, and event E2,1 has no ancestor events that are forks with event B1,1. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 3, if M is defined to be the least integer that is more than ⅔ of N (i.e., M=1+floor(2N/3), which would be four in this example), then event E2,1 strongly identifies ancestor event D1,1 because the set of events D1,1, C1,1, B1,2, and E2,1 is a set of at least four events that are ancestors of event E2,1 and descendants of event D1,1, and they are created and/or defined by the four members D, C, B, and E, respectively, and event E2,1 identifies each of events D1,1, C1,1, B1,2, and E2,1, and each of events D1,1, C1,1, B1,2, and E2,1 identifies event D1,1. Similarly stated, an event X (e.g., event E2,1) can "strongly see" event Y (e.g., event D1,1) if X can see at least M events (e.g., events D1,1, C1,1, B1,2, and E2,1) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 3, event E2,1 is a "round 2 first" event because it has a Round Number of two, and its self-parent is event E1,1, which has a Round Number of one (i.e., smaller than two). In some instances, the Round Increment for an event X is defined to be 1 if and only if X "strongly identifies" at least M "round R first" events, where R is the maximum Round Number of its parents. For example, in FIG. 3, if M is defined to be the least integer greater than ½ times N, then M is three. Then event E2,1 strongly identifies the M events D1,1, C1,1, and E1,1, all of which are round 1 first events. Both parents of E2,1 are round 1, and E2,1 strongly identifies at least M round 1 firsts, therefore the round increment for E2,1 is one. The events in the diagram marked with "RI=0" each fail to strongly identify at least M round 1 firsts, therefore their round increments are 0.

"Famous" event: a round R event X is "famous" if (1) the event X is a "round R first" event (or "witness") and (2) a decision of "YES" is reached via execution of a Byzantine agreement protocol among the voting committee members, described below. In some embodiments, the Byzantine agreement protocol can be executed by the distributed database modules 162 of the members of the voting committee VC. For example, in FIG. 3, there are five round 1 firsts shown: D1,1, C1,1, B1,1, A1,1, and E1,1. If M is defined to be the least integer greater than ½ times N, which is three, then E2,1 is a round 2 first. As the protocol runs longer, the chain graph 180 grows upward as shown in FIG. 3, and the other four members also have round 2 firsts. Each round 2 first will have a "vote" on whether each of the round 1 firsts is "famous". Event E2,1 would vote YES for D1,1, C1,1, and B1,1 being famous, because those are round 1 firsts that it can identify. Event E2,1 would vote NO for A1,1 being famous, because E2,1 cannot identify A1,1. For a given round 1 first, such as C1,1, its status of being "famous" or not will be decided by calculating the votes of each round 2 first for whether it is famous or not. Those votes will then propagate to round 3 firsts, then to round 4 firsts and so on, until eventually agreement is reached on whether C1,1 was famous. The same process is repeated for other firsts.

A Byzantine agreement protocol can collect and use the votes and/or decisions of "round R first" events to identify "famous events. For example, a "round R+1 first" Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G-1 firsts voting V (where V is either "YES" or "NO"), then the consensus decision is V, and the Byzantine agreement protocol ends. Otherwise, each round G first event calculates a new vote that is the majority of the round G-1 firsts that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 3, consider some round first event X that is occurs in the timeline before the events shown in the Figure. Then, each round 1 first will have a vote on whether X is famous. Event E2,1 can strongly identify the round 1 first events D1,1, C1,1, and E1,1. So its vote will be based on their votes. If this is a majority round, then E2,1 will check whether at least M of {D1,1, C1,1, E1,1} have a vote of YES. If they do, then the decision is YES, and the agreement has been achieved. If at least M of them vote NO, then the decision is NO, and the agreement has been achieved. If the vote doesn't have at least M either direction, then E2,1 is given a vote that is a majority of the votes of those of D1,1, C1,1, and E1,1 (and would break ties by voting YES, if there were a tie). That vote would then be used in the next round, continuing until agreement is reached.

In some instances, if round G is a coin round, the votes can be calculated as follows. If event X can identify at least M round G-1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol. For example, in FIG. 3, if round 2 is a coin round, and the vote is on whether some event before round 1 was famous, then event E2,1 will first check whether at least M of {D1,1, C1,1, E1,1} voted YES, or at least M of them voted NO. If that is the case, then E2,1 will vote the same way. If there are not at least M voting in either direction, then E2,1 will have a random or pseudorandom vote (e.g., based on the least significant bit of the digital signature that E created for event E2,1 when he signed it, at the time he created and/or defined it). In some instances, the result of the pseudo-random determination can be the result of a cryptographic shared coin protocol, which can, for example, be implemented as the least significant bit of a threshold signature of the round number.

Distributed database modules 162 of members can be configured to be implement V2X distributed database system 150 using any one of the methods for calculating the result of the pseudo-random determination described above. In some instances, the distributed database modules 162 cycle through the different methods in some order. In other instances, the distributed database modules 162 can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used. For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows: Find which member created and/or defined each round R first event that can identify event X; then determine the generation number for the earliest event by that member that can identify X; then define the "received generation" of X to be the median of that list.

In some instances, a "received timestamp" T of an event X can be the median of the timestamps in the events that include the first event by each member that identifies and/or sees X. For example, the received timestamp of event D1,1 can be the median of the value of the timestamps for events C1,1, B1,1, B1,1, and E1,1. In some instances, the timestamp for event D1,1 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round (also referred to herein as an order value), breaking ties by their received timestamp, and breaking those ties by their signatures. In other instances, the total order for the events can be calculated by sorting the events by their received round, breaking ties by their received generation, and breaking those ties by their signatures.

In some instances, a state of the V2X distributed database system 150 can be defined after a consensus is achieved. For example, if S(R) is the set of events that can be seen by the famous witnesses of the voting committee VC in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value and include the hash value in the next event that member defines. This can be used to inform the other members that that member has determined that the events in S(R) have the given order that will not change. After at least M of the members of the voting committee VC (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In other instances, if events contain transactions that update a state of the distributed database system (as described herein), then the hash value can be of the state of the distributed database system after applying the transactions of the events in S(R) in the consensus order.

In example embodiments, an event synchronizing signal flow in SL WLAN network 140 between two members of V2X distributed database system 150 may be as follows. Specifically, in some embodiments, the distributed database members (e.g., members A and B) can exchange events to obtain convergence. Member A can select to sync with member B randomly. In some embodiments, because member B can be chosen by member A from the set of computing devices belonging to the distributed database system 150, member A can select member B multiple times in a row or may not select member B for an extended period.

As noted above, FIG. 3 illustrates an examples of a chain graph 180 for a voting committee VC having 5 members A to E. Every event in this example has two downward lines (one dark line to the same member and one light line to another member), except for each member's first event. Time progresses upward.

In the example of members A and B, a sync between them can be described as follows: Member A sends Member B the events stored in member A's version of hashgraph 180; Member B creates a new event which contains: a hash H1 of the last event member B created and a hash H2 of the last event member A created, and a digital signature by member B; Member B sends sends member A the events stored in member B's version of hashgraph 180; Member B creates a new event which contains: a hash H1 of the last event member A created and a hash H2 of the last event member B created, and a digital signature by member A. Member A sends member B that event; Member A calculates a total order for the events, as a function of member A's version of the hashgraph 180; and Member B calculates a total order for the events, as a function of a member B's version of the hashgraph 180.

In the Example of FIG. 3, event B4,2 is created and/or defined by member B as a result of and after syncing with member C. Event B4,2 includes a hash H1 of event B4,1 (the previous event created by member B) and a hash H2 of event C4,1 (the previous event created by member C). In some embodiments, for example, the hash of event B4,1 included within event B4,2 includes a pointer to its immediate ancestor events, events A3,2 and B3,2. As such, member node B can use the event B4,2 to reference events A3,2 and B3,2 and reconstruct the hashgraph using the pointers to the prior events. In some instances, event B4,2 can be said to be linked to the other events in the chain graph 180 since event B4,2 can reference each of the events in the chain graph 180 via earlier ancestor events. For example, event B4,2 is linked to event A3,2 via event B4,1. For another example, event B4,2 is linked to event E3,1 via events C4,1 and event D3,2.

As noted above, in example embodiments, each event 302 includes Data that can comprise environmental data about a vehicle's surrounding physical environment and the vehicle's physical operating environment. This Data can be used to update hashgraph events with information about environmental activities that have occurred since a member's immediately prior event. For example, the event B4,2 can include environmental data recorded by member B since event B4,1 was created. Thus, when syncing event B4,2 with other members, member B can share this information. Accordingly, the environmental data recorded by member B can be associated with an event and shared with the other members.

In example, embodiments, synchronization between members is limited to unknown events. For example, member A does not send member B events created by member B, nor ancestor events of such an event. Similarly stated, in such embodiments member B sends member A the events not yet stored by member A and does not send events already stored by member A.

In example embodiments, once events have been ordered and authenticated by members of the voting committee that information is represented in new events that are then disseminated to the remaining members of the V2X distributed database system 150 using random synch exchanges.

Overview of Random Voting Committee Consensus Process

Figure 8:
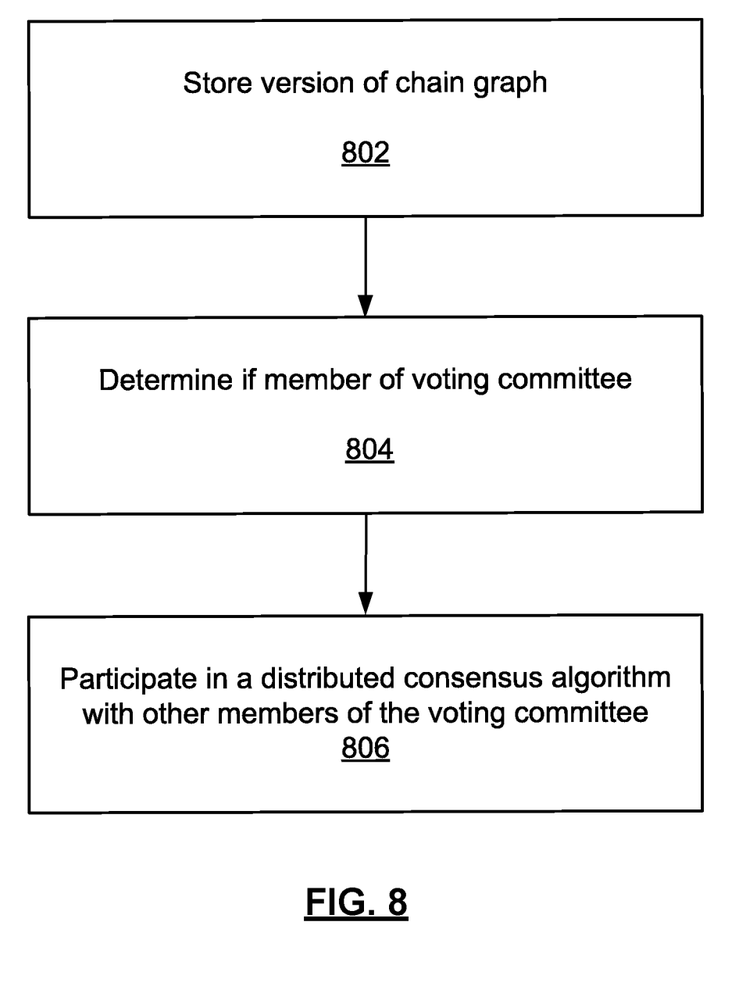
FIG. 8 is a flow diagram of one example of method performed by a computing device according to example embodiments.

By way of summary, FIG. 8 illustrates a method that can be carried out by a computing device 115($i$) that functions as a member of the V2X distributed database system 150 within SL V2X communication network 140. As indicated by block 802, computing device 115($i$) stores a member version of a chain graph 180. The chain graph 180 includes events 302 created by the computing device 115($i$) and events 302 received through the wireless network from other computing devices 115 that are members of the V2X distributed database system 150. As indicated at block 804, the computing device 115($i$) determines if it is a member of a voting committee VC that comprises only a subset of the computing devices 115 that are members of the V2X distributed database system 150. As indicated in block 806, if the computing device 115($i$) is a member of a voting committee, the computing device 115($i$) participates in a distributed consensus algorithm with other members of the voting committee VC using the SL V2X communication network 140 to define an order of the events 302 in the chain graph 180 and store that order as a new event 302 in the member version of the chain graph 180.

In example embodiments, membership of the voting committee VC varies during a time period that the computing device 115($i$) is a member of the V2X distributed database system 150 and determining if the computing device 115($i$) is a member of the voting committee is performed multiple times during the time period.

In example embodiments, the computing device randomly sends events that it has created to, and receives events from, the other computing devices according to a gossip protocol. In example embodiments, the distributed consensus algorithm comprises a Byzantine agreement protocol.

In example embodiments, the computing device 115($i$) is appointed to the voting committee VC through a randomized non-interactive selection procedure 500 such as shown in FIG. 5. In this regard, the computing device 115($i$) is configured to determine if it is a member of the voting committee VC by determining if a member ID associated with the computing device 115($i$) matches a predetermined criteria and if so, then then the computing device 115($i$) is a member of the voting committee. In some example determining if the member ID associated with the computing device matches the predetermined criteria comprises determining if a bit sequence within the member ID matches a predetermined bit sequence (e.g., 4LSB match). In some examples, the computing device 115($i$) updates its member ID at fixed time intervals by cyclically shifting bits of the member ID.

In example embodiments, the computing device 115($i$) is appointed to the voting committee VC through a randomized interactive selection procedure as illustrated in FIGS. 6 and 7. In this regard, the computing device 115($i$) is configured to determine if it is a member of the voting committee based on whether it has received a voting committee token from further one of the computing device 115 that is an existing member of the voting committee VC. Additionally, after the computing device 115($i$) has been a member of the voting committee VC (e.g., after a predefined time interval), it is configured to appoint a replacement computing device 115($j$) from among the other computing devices 115 to replace the computing device 115($i$) as member of the voting committee VC. In example embodiments, appointing the replacement computing device 115 ($j$) comprises: randomly selecting one of the other computing devices 115 that is a member of the V2X distributed database system 150 as the replacement computing device 115($j$); sending the voting committee token to the replacement computing device 115 ($j$); receiving an acknowledgement from the replacement computing device 115($j$); upon authenticating the acknowledgement, notifying any of the other computing devices 115 that are members of the voting committee VC of the appointment of the replacement computing device 115($j$) as a member of the voting committee VC.

General

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Separate boxes or illustrated separation of functional elements of illustrated systems, modules and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method performed at a computing device that is a member of a distributed database system implemented using a wireless network, comprising:
   storing a member version of a chain graph at the computing device, the chain graph including events created by the computing device and events received through the wireless network from other computing devices that are members of the distributed database system;
   determining if the computing device is a member of a voting committee that comprises a selected subset of the computing devices that are members of the distributed database system by determining if a bit sequence within a member ID associated with the computing device matches a predetermined bit sequence and if so, then determining that the computing device is a member of the voting committee; and
   in response to determining that the computing device is a member of the voting committee, participating in a distributed consensus algorithm with other members of the voting committee using the wireless network to define an order of the events in the chain graph and storing that order as a new event in the member version of the chain graph.

2. The method of claim 1 wherein membership of the voting committee varies during a time period that the computing device is a member of the distributed database system and determining if the computing device is a member of the voting committee is performed multiple times during the time period.

3. The method of claim 2 comprising exchanging events with other computing devices using a gossip protocol.

4. The method of claim 3 wherein the distributed consensus algorithm comprises a Byzantine agreement protocol.

5. The method of claim 1 comprising updating the member ID at fixed time intervals by cyclically shifting bits of the member ID.

6. A method performed at a computing device that is a member of a distributed database system implemented using a wireless network, comprising:
   storing a member version of a chain graph at the computing device, the chain graph including events created by the computing device and events received through the wireless network from other computing devices that are members of the distributed database system;
   determining if the computing device is a member of the voting committee that comprises a selected subset of the computing devices that are members of the distributed database system by determining if the computing device has received a voting committee token from a computing device that is an existing member of the voting committee;
   in response to determining that the computing device is a member of the voting committee, participating in a distributed consensus algorithm with other members of the voting committee using the wireless network to define an order of the events in the chain graph and storing that order as a new event in the member version of the chain graph; and
   appointing a replacement computing device from among the other computing devices to replace the computing device as member of the voting committee by:
      randomly selecting one of the other computing devices that is a member of the distributed database system as the replacement computing device;
      sending the voting committee token to the replacement computing device;
      receiving an acknowledgement from the replacement computing device; and
      upon authenticating the acknowledgement, notifying any of the other computing devices that are members of the voting committee of the appointment of the replacement computing device as a member of the voting committee.

7. A computing device configured to function as a member of a distributed database system implemented using a wireless network, the computing device comprising:
   a processor system;
   a wireless transceiver connected to the processor system for exchanging signals with other computing devices using wireless network;
   a non-transitory memory connected to processor system and storing instructions that configure the processor system to:
      store a member version of a chain graph at the computing device, the chain graph including events created by the computing device and events received through the wireless network from other computing devices that are members of the distributed database system;
      determine if the computing device is a member of a voting committee that comprises a selected subset of the computing devices that are members of the distributed database system when a member ID associated with the computing device or a bit sequence within the member ID matches a predetermined bit sequence; and
      in response to determining that the computing device is a member of the voting committee, participate in a distributed consensus algorithm with other members of the voting committee using the wireless network to define an order of the events in the chain graph and storing that order as a new event in the member version of the chain graph.

8. The computing device of claim 7 wherein membership of the voting committee varies during a time period that the computing device is a member of the distributed database system, and the instructions configure the processor system to determine if the computing device is a member of the voting committee multiple times during the time period.

9. The computing device of claim 8 wherein the instructions configure the processor system to cause the computing device to randomly send events that it has created to the other computing devices using a gossip protocol.

10. The computing device of claim 9 wherein the distributed consensus algorithm comprises a Byzantine agreement protocol.

11. The computing device of claim 7 wherein the instructions configure the processor system to update the member ID at fixed time intervals by cyclically shifting bits of the member ID.

12. A computing device configured to function as a member of a distributed database system implemented using a wireless network, the computing device comprising:
  a processor system;
  a wireless transceiver connected to the processor system for exchanging signals with other computing devices using wireless network;
  a non-transitory memory connected to processor system and storing instructions that configure the processor system to:
    store a member version of a chain graph at the computing device, the chain graph including events created by the computing device and events received through the wireless network from other computing devices that are members of the distributed database system;
    determine the computing device is a member of a voting committee that comprises a selected subset of the computing devices that are members of the distributed database system when the computing device has received a voting committee token from a computing device that is an existing member of the voting committee;
  in response to determining that the computing device is a member of the voting committee, participate in a distributed consensus algorithm with other members of the voting committee using the wireless network to define an order of the events in the chain graph and storing that order as a new event in the member version of the chain graph; and
  appoint a replacement computing device from among the other computing devices to replace the computing device as member of the voting committee by:
    randomly selecting one of the other computing devices that is a member of the distributed database system as the replacement computing device;
    sending, using the wireless transceiver, the voting committee token to the replacement computing device;
    receiving, using the wireless transceiver, an acknowledgement from the replacement computing device; and
    upon authenticating the acknowledgement, notifying any of the other computing devices that are members of the voting committee of the appointment of the replacement computing device as a member of the voting committee.

* * * * *